United States Patent
Han et al.

(10) Patent No.: US 9,077,430 B2
(45) Date of Patent: Jul. 7, 2015

(54) METHOD, DEVICE AND SYSTEM FOR TRANSMITTING RELAY DATA

(75) Inventors: Lifeng Han, Guandong Province (CN); Dapeng Li, Guangdong Province (CN); Yada Huang, Guangdong Province (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 373 days.

(21) Appl. No.: 13/259,664

(22) PCT Filed: Apr. 20, 2010

(86) PCT No.: PCT/CN2010/071941
§ 371 (c)(1),
(2), (4) Date: Oct. 28, 2011

(87) PCT Pub. No.: WO2010/124572
PCT Pub. Date: Nov. 4, 2010

(65) Prior Publication Data
US 2012/0039240 A1 Feb. 16, 2012

(30) Foreign Application Priority Data
Apr. 28, 2009 (CN) .......................... 2009 1 0137248

(51) Int. Cl.
*H04B 7/14* (2006.01)
*H04B 7/26* (2006.01)
*H04B 7/155* (2006.01)
*H04W 84/04* (2009.01)

(52) U.S. Cl.
CPC .............. *H04B 7/2606* (2013.01); *H04B 7/155* (2013.01); *H04W 84/047* (2013.01)

(58) Field of Classification Search
USPC .......................... 370/315, 328, 338, 401, 535
See application file for complete search history.

(56) References Cited

U.S. PATENT DOCUMENTS

| | | | |
|---|---|---|---|
| 7,006,508 B2 * | 2/2006 | Bondy et al. | 370/410 |
| 7,380,022 B2 * | 5/2008 | Tell et al. | 709/249 |
| 8,023,426 B2 * | 9/2011 | Liu et al. | 370/252 |
| 8,054,745 B2 * | 11/2011 | Cheng et al. | 370/230 |
| 8,125,939 B2 * | 2/2012 | Murasawa et al. | 370/315 |

(Continued)

FOREIGN PATENT DOCUMENTS

| CN | 1964225 A | 5/2007 |
|---|---|---|
| CN | 101365239 A | 2/2009 |

(Continued)

OTHER PUBLICATIONS

International Search Report dated Jul. 29, 2010, issued in corresponding International Application No. PCT/CN2010/071941.
Nortel: "One Tunnel and GGSN Bearer Relay: SGSN User Plane". 3GPP Draft: S2-061619 User_Plane_Final. 3rd Generation Partnership Project (3GPP_, Mobile Competence Centre: 650, Route Des Lucioles: F-06921 Sophia-Antipolis Vedex: France, vol. SA WG2, No. Shanghai, China; 20060508-20050512, May 3, 2005,XP050626759.

(Continued)

*Primary Examiner* — Ricky Ngo
*Assistant Examiner* — Christine Ng
(74) *Attorney, Agent, or Firm* — Scully, Scott, Murphy & Presser, P.C.

(57) ABSTRACT

A method, a device and a system for transmitting relay data are provided, wherein, the method for transmitting the relay data includes: relay radio access bearer service between a relay node and a relay serving gateway is bore by a relay radio access bearer, so that the relay for the radio access bearer service of the terminal is completed. The method realizes the relay node relays data between a user equipment and a serving gateway.

11 Claims, 9 Drawing Sheets

(56) References Cited

U.S. PATENT DOCUMENTS

| | | | |
|---|---|---|---|
| 2004/0156334 A1 | 8/2004 | Okubo | |
| 2005/0213580 A1 | 9/2005 | Mayer et al. | |
| 2007/0070959 A1* | 3/2007 | Almeroth et al. | 370/338 |
| 2010/0202343 A1* | 8/2010 | Hunzinger et al. | 370/315 |
| 2010/0208658 A1* | 8/2010 | Vesterinen | 370/328 |
| 2010/0296448 A1* | 11/2010 | Vainikka et al. | 370/328 |
| 2011/0044279 A1* | 2/2011 | Johansson et al. | 370/329 |

FOREIGN PATENT DOCUMENTS

| | | |
|---|---|---|
| CN | 101383775 A | 3/2009 |
| CN | 101651950 A | 2/2010 |
| CN | 101656983 A | 2/2010 |
| EP | 1 848 167 A1 | 10/2007 |
| WO | 2009/049683 A1 | 4/2009 |

OTHER PUBLICATIONS

"3$^{rd}$Generation Partnership Project; Technical Specification Group Radio Access Network; Evolved Universal Terrestrial Radio Access (E-UTRA); Relay architectures for E-UTRA (LTE-Advanced) (Release 9)", 3GPP Draft: R2-097537_TR_36806_v020_Relay, 3$^{rd}$Generation Partnership Project (3GPP), Mobile Competence Centre: 650, Route Des Lucioles; F-06921 Sophia-Antipolis Cedex: France, vol./ RAN WG2, No. Jeju: Nov. 9, 2009. Nov. 19, 2009. XP050420623.

"Preference for Relay Operation in LTE-A", Qualcom Europe, (3GPP TSG-RAN WG2 #65bis. R2-092153) Mar. 27, 2009.

Supplementary European Search Report mailed Oct. 21, 2013 issued in Application No. EP 10 76 9261.

* cited by examiner

METHOD, DEVICE AND SYSTEM FOR TRANSMITTING RELAY DATA

FIELD OF THE INVENTION

The present invention relates to communication field, and in particular to a method, a device and a system for transmitting relay data.

BACKGROUND OF THE INVENTION

Figure 1:
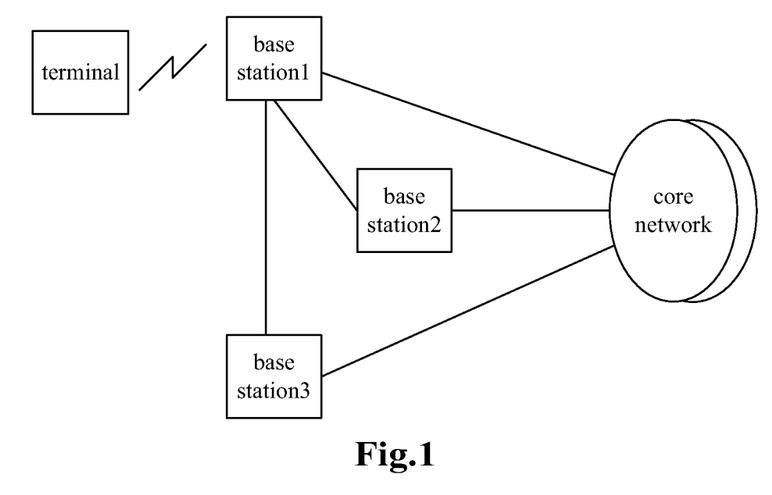
FIG. 1 is a schematic diagram of structure of a cellular wireless communication system in prior art.

FIG. 1 is a schematic diagram of the structure of a cellular wireless communication system in prior art. As shown in FIG. 1, the cellular wireless communication system mainly includes: a terminal (User Equipment, referred to as UE), an access network and a core network, wherein the terminal refers to various equipments which can communicate with the cellular wireless communication network, such as, mobile phone or notebook PC. The Radio Access Network (RAN) refers to the network composed of a base station, or the network composed of a base station and a base station controller, and is mainly responsible for access stratum service, such as radio resource management. There is a physical connection or a logical connection between the base stations according to actual situations, such as, the connection between the base station 1 and the base station 2, and the connection between the base station 1 and the base station 3 shown in FIG. 1. The core network is an anchor point of the user plane, and is mainly responsible for non-access stratum service, such as location update. Each of the base stations can connect one or more core network (CN) nodes.

In the cellular wireless communication system, the wireless coverage of a fixed base station network will be restricted due to some reasons, such as, the blocking that building structure creates for radio signal caused will result in a coverage loophole for the wireless network. In addition, at the cell edge area, due to the weakening of wireless signal intensity in the edge area of the cell and the interference of neighboring cells, the communication quality of the UE at the cell edge area will be poorer, and error rate of wireless transmission will increase. In order to improve the coverage rate of the data rate, group mobility, temporary network deployment, throughput at the cell edge area, and coverage of a new area, a wireless network node, which is referred to as relay node/ relay station, is introduced in the cellular wireless communication system.

Figure 2:
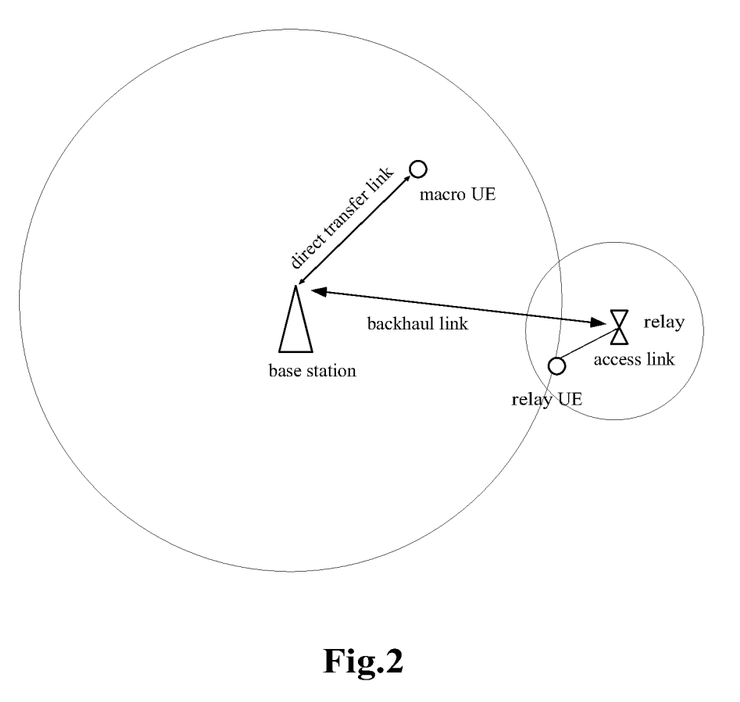
FIG. 2 is a schematic diagram of network architecture including the relay in prior art.

The relay node (referred to as Relay below) has the function of relaying data and possible control information via a wireless link. FIG. 2 is a schematic diagram of a network architecture including the relay in prior art. As shown in FIG. 2, the UE directly served by a base station (eNodeB, which can also be abbreviated to eNB) is referred to as a Macro UE, and the UE served by the Relay is referred to as Relay UE, wherein a direct link refers to the wireless link between the base station and the UE, which includes an uplink/downlink (UL/DL) direct link; an access link refers to the wireless link between the Relay and the UE, which includes a DL/UL access link; and a backhaul link refers to the wireless link between the base station and the Relay, which includes a DL/UL relay link.

There are many ways for the Relay to relay data, for example, amplifying directly the wireless signal received from a base station; or forwarding the correctly received data packet to the terminal after performing a corresponding process on the received data sent from the base station; or sending data to the terminal by the base station cooperating with the Relay, and also the Relay being used for relaying the data sent from the terminal to the base station.

In the above, there is a relay, which has the following characteristics:

the UE can not distinguish the relay from the cell of the fixed base station, that is to say, from the viewpoint of the UE, the relay itself is a cell which has no difference from the cell of the fixed base station, and such cell can be referred to as a relay cell. The relay cell has its own physical cell identity (PCI), which can send broadcast, similar to a common cell. When the UE resides in the relay cell, the relay cell can allocate and schedule radio resource to the UE separately, which can be independent of the radio resource scheduling for the base station engaging in relaying (the base station is referred to as a Donor base station, that is, the base station connected with the Relay via a backhaul link). Interface and protocol stack between the relay cell and the UE are identical with those between a common base station cell and a UE.

Figure 3:
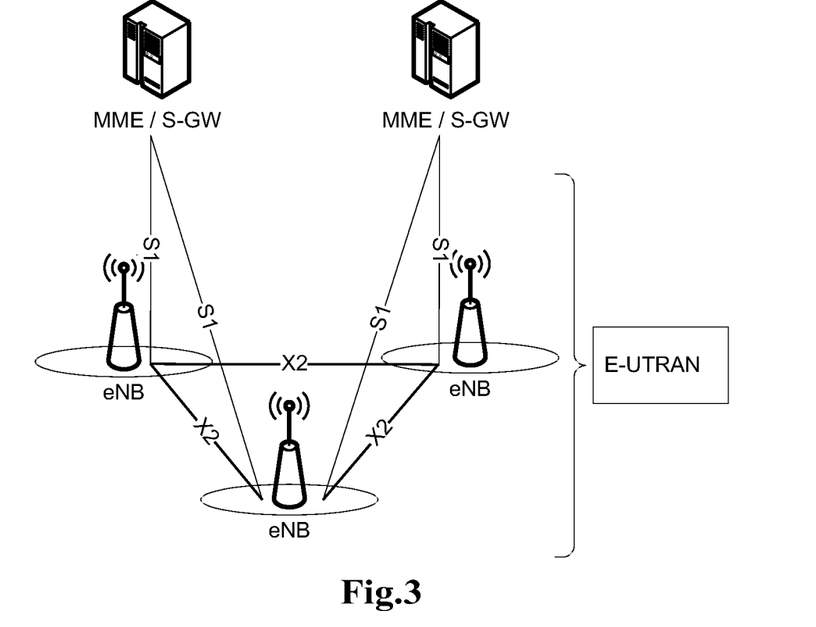
FIG. 3 is a schematic diagram of flat structure of the IP-based LTE system in related art.

FIG. 3 is a schematic diagram of flat structure of in related art. As shown in FIG. 3, the IP (Internet Protocol)-based long term evolution (LTE) system consists of an E-UTRAN (Evolved Universal Terrestrial Radio Access Network), a CN node, and other support nodes, wherein the CN node includes a MME (Mobility Management Entity) and a S-GW (Serving Gateway), wherein the MME is responsible for control plane related tasks, such as mobility management, signaling processing in non-access stratum, and context management of mobility management for the UE; the S-GW is responsible for data transferring, retransmitting, and routing switching for the UE plane; the eNBs interconnect with each other via X2 interface in logic to support the mobility of the UE in the whole network, so as to ensure seamless switching of the UE; each eNB is connected to a SAE (System Architecture Evolution) core network via S1 interface, that is to say, connected to MME via the control plane S1-MME interface, connected to the S-GW via the S1-U interface of user plane, wherein the S1 interface supports multipoint connection between the eNB and the MME and between the eNB and the S-GW.

Figure 4:
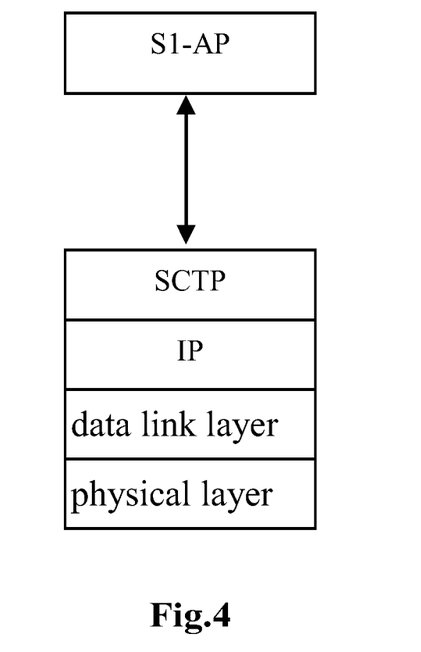
FIG. 4 is a schematic diagram of protocol stack of S1-MME interface in related art.
Figure 5:
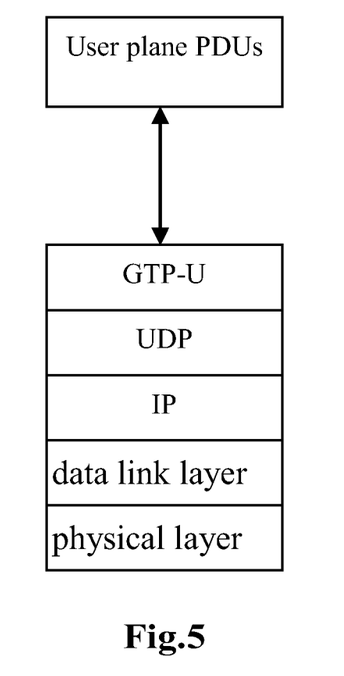
FIG. 5 is a schematic diagram of protocol stack of S1-U interface in related art.

FIG. 4 is a schematic diagram of protocol stack of S1-MME interface in related art. As shown in FIG. 4, the network layer of S1-MME interface employs IP protocol, the transport layer above the network layer employs the SCTP protocol, and the application layer in uppermost layer (that is S1-AP protocol of the control plane) employs the S1-AP signaling transmitted by the transmission bearer in bottom layer, and the layers below the network layer which employs IP-based S1-MME interface sequentially are the data link layer and the physical layer. FIG. 5 is a schematic diagram of protocol stack of S1-U interface in related art. As shown in FIG. 5, the User plane of GPRS (General Packet Radio Service) Tunneling Protocol (GTP-U)/User Datagram Protocol (UDP)/IP constitute transmission bearer for transmitting the user plane PDU (Protocol Data Unit) between the eNB and the S-GW. The transmission bearer is identified by tunnel endpoint identifiers (TEID) of the GTP-U including the source side GTP-U TEID and the target side GTP-U TEID, and IP addresses including the source side IP address and the target side IP address, wherein the UDP port number is fixed as 2152; the GTP-U is a tunneling protocol for implementing the seamless transmission on the IPv4 and the IPv6. Each transmission bearer is used to carry service data flows.

Figure 6:
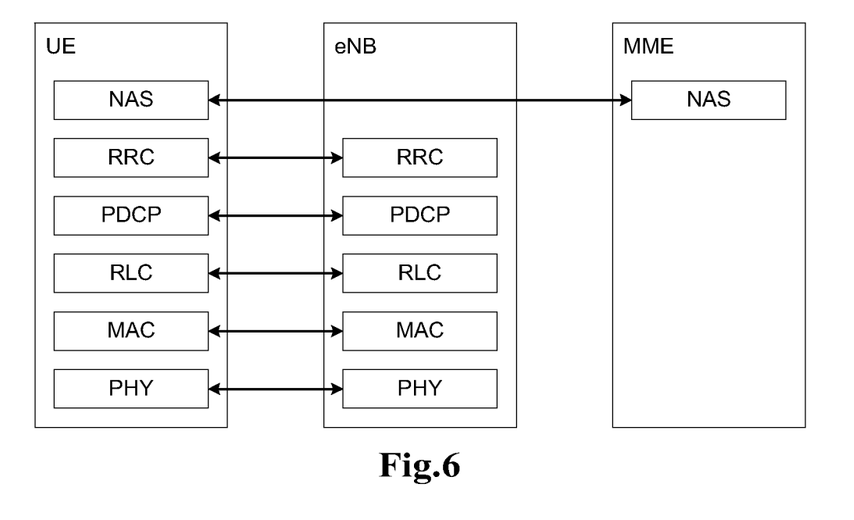
FIG. 6 shows the protocol stack of the air interface between the eNB and L1, L2, L3 of the UE on the control plane.
Figure 7:
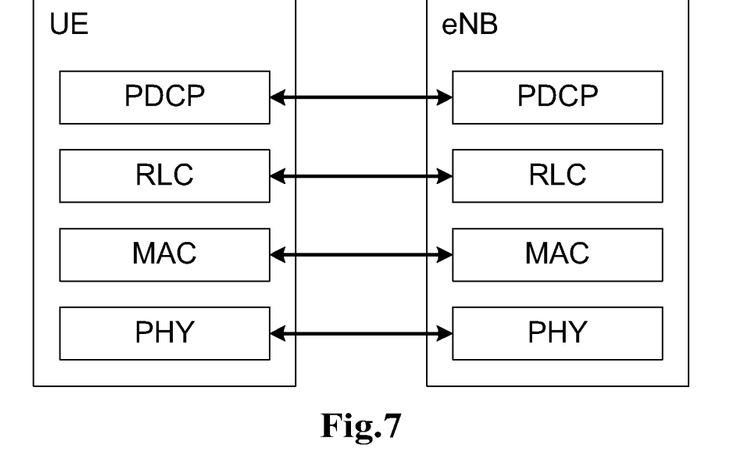
FIG. 7 shows the protocol stack of the air interface between the eNB and L1, L2, L3 of the UE on the user plane.

Each eNB performs the signaling and data transmission with the UE via a Uu interface (which is defined as the wireless interface between the UTRAN and the UE initially). FIG. 6 and FIG. 7 illustrate protocol stack of the air interface between the eNB and L1, L2, L3 of the UE respectively from the control plane and the UE plane.

Figure 8:
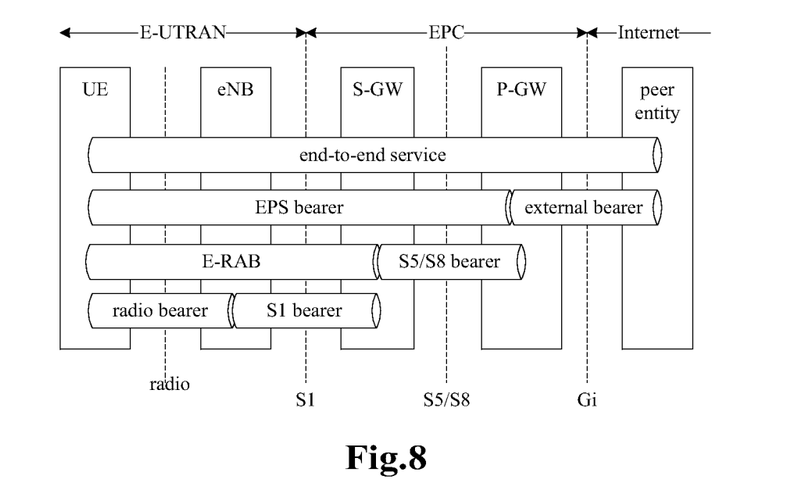
FIG. 8 is a schematic diagram of the bearer structure of the LTE system in prior art.

FIG. 8 is a schematic diagram of the bearer structure of the LTE system in related art. As shown in FIG. 8, the LTE system can provide end-to-end service, and ensure quality of service (QoS) of the provided service through the parameters carried particularly. The granularity ensured by the QoS level of the bearers of the Evolved Packet Core (EPC) and the E-UTRAN is EPS bearer/E-RAB (E-UTRAN Radio Access Bearer). Data packet carried by the EPS bearer is transmitted between the S-GW and PDN gateway (P-GW) via S5/S8 bearer. The data packet of the E-RAB is transmitted between the eNodeB and the S-GW via S1 Bearer, and transmitted between the UE and the eNodeB via radio bearer (RB).

For the LTE system in which the relay cell is introduced, there is still no technical solution for the Relay node to relay data between the UE and the S-GW.

SUMMARY OF THE INVENTION

The present invention is provided in view of that there is no technical solution for a Relay node to relay data between a UE and a S-GW in existing LTE system. Thus, the present invention intends to provide a solution for transmitting the relay data, so as to solve the above problem.

According to one aspect of the present invention, there is provided a method for transmitting relay data, which is applied in a system comprising a relay node.

The method for transmitting the relay data in accordance with the present invention comprises: a relay radio access bearer service between a relay node and a relay Serving Gateway (S-GW) is bore by a relay radio access bearer, so that the relay for the radio access bearer service of a terminal is completed.

In the above, before the relay radio access bearer service is bore, the method further comprises: the relay node or the relay S-GW multiplexes the radio access bearer service of a plurality of terminals to obtain the relay radio access bearer service to be bore.

After the relay node multiplexes the radio access bearer service of a plurality of terminals and the relay radio access bearer bears the relay radio access bearer service, the method further comprises: the relay S-GW receives the bore relay radio access bearer service, and demultiplexes the received relay radio access bearer service, to obtain the radio access bearer services of the multiple terminals.

After the relay S-GW multiplexes the radio access bearer service needed to be sent to the multiple terminals and the relay radio access bearer carries the relay radio access bearer service, the method further comprises: the relay node receives the bore relay radio access bearer service, and demultiplexes the received relay radio access bearer service, to obtain the radio access bearer service needed to be sent to the multiple terminals.

Preferably, the above method further comprises one of the following: the relay node or the relay S-GW makes the user plane protocol address of tunneling protocol allocated to the radio bearer of the radio access bearer service, to be used as the identifier for multiplexing and/or demultiplexing; the relay node or the relay S-GW makes the identifier allocated to each radio access bearer to be used as the identifier for multiplexing and/or demultiplexing; and the relay node or the relay S-GW makes the tunnel endpoint identifier allocated to the radio bearer of the radio access bearer service to be used as the identifier for multiplexing and/or demultiplexing.

The relay radio access bearer is also configured to transmit the S1-AP control signaling of the terminal on the user plane or the control plane.

In the above, the step of the relay radio access bearer transmitting the S1-AP control signaling of the terminal on the user plane comprises: the relay node or the relay S-GW multiplexes the S1-AP control signaling of the multiple terminals according to respective S1-AP identifier, to obtain the relay radio access bearer service to be bore.

The step of relay radio access bearer transmitting the S1-AP control signaling of the terminal on the control plane comprises: the S1-AP control signaling of the terminals is transmitted via a control plane direct transfer message of the relay radio access bearer, wherein the S1-AP control signaling of the multiple terminals according to a S1-AP identifier multiplexed as a part of the control plane direct transfer message of the relay radio access bearer, so as to be transmitted; and in the case that the relay node performs the multiplex operation, a core network mobility management entity performs a demultiplex operation; or in the case that the core network MME performs the multiplex operation, the relay node performs a demultiplex operation.

According to one aspect of the present invention, there is provided a relay node.

The relay node according to the present invention comprises: a first receiving module, configured to receive radio access bearer service from a terminal; a second receiving module, configured to receive the relay radio access bearer service from a core network; a multiplexing module, configured to multiplex the S1-AP control signaling and/or the radio access bearer service of the multiple terminals received by the first receiving module; a de-multiplexing module, configured to demultiplex the multiplexed S1-AP control signaling and/or the radio access bearer service received by the second receiving module; a first transmitting module, configured to transmit, via a relay radio access bearer, to the S-GW the radio access bearer service and/or the S1-AP control signaling multiplexed by the multiplexing module; a second transmitting module, configured to transmit via a control plane the S1-AP control signaling multiplexed by the multiplexing module; and a third transmitting module, configured to send, via an air interface, to the terminal the demultiplexed radio access bearer service of the terminal.

According to one aspect of the present invention, a relay serving gateway is provided.

The relay serving gateway according to the present invention comprises: a receiving module, configured to receive the multiplexed S1-AP control signaling and/or the radio access bearer service from the relay node; a de-multiplexing module, configured to demultiplex the S1-AP control signaling and/or the radio access bearer service which are multiplexed and received by the receiving module; a multiplexing module, configured to multiplex the S1-AP control signaling and/or the radio access bearer service from the core network; a transmitting module, configured to transmit, via a relay radio access bearer, to the relay node the radio access bearer service and/or the S1-AP control signaling multiplexed by the multiplexing module.

According to one aspect of the present invention, a mobility management network element is provided.

The mobility management network element according to the present invention comprises: a receiving module, configured to receive the multiplexed S1-AP control signaling from the relay node; a de-multiplexing module, configured to demultiplex the multiplexed S1-AP control signaling received by the receiving module; a multiplexing module, configured to multiplex the plurality of S1-AP control signalings; and a transmitting module, configured to transmit, via a control plane direct transfer message, to the relay node the S1-AP control signaling multiplexed by the multiplex module.

According to one aspect of the present invention, a system for transmitting the relay data is provided.

The system for transmitting the relay data according to the present invention comprises: a relay node and a serving gateway, and/or a mobility management network element, wherein the relay node comprises: a first receiving module, configured to receive a S1-AP control signaling and a radio access bearer service from a terminal; a second receiving module, configured to receive a relay radio access bearer service from the core network; a multiplexing module, configured to multiplex the S1-AP control signaling and/or the radio access bearer service of the multiple terminals received by the first receiving module; a de-multiplexing module, configured to demultiplex the multiplexed S1-AP control signaling and/or the radio access bearer service received by the second receiving module; a first transmitting module, configured to transmit, via a relay radio access bearer, to the S-GW the radio access bearer service and/or the S1-AP control signaling multiplexed by the multiplexing module; a second transmitting module, configured to transmit via a control plane the S1-AP control signaling multiplexed by the multiplexing module; and a third transmitting module, configured to send, via an air interface, to the terminal the demultiplexed radio access bearer service of the terminal.

The relay serving gateway comprises: a receiving module, configured to receive the multiplexed S1-AP control signaling and/or the radio access bearer service from the relay node; a de-multiplexing module, configured to demultiplex the S1-AP control signaling and/or the radio access bearer service which are multiplexed and received by the receiving module; a multiplexing module, configured to multiplex the S1-AP control signaling and/or the radio access bearer service from the core network; a transmitting module, configured to transmit, via a relay radio access bearer, to the relay node the radio access bearer service and/or the S1-AP control signaling multiplexed by the multiplexing module.

The mobility management network element comprises: a receiving module, configured to receive the multiplexed S1-AP control signaling from the relay node; a de-multiplexing module, configured to demultiplex the multiplexed S1-AP control signaling received by the receiving module; a multiplexing module, configured to multiplex the plurality of S1-AP control signalings; a transmitting module, configured to transmit, via a control plane direct transfer message, to the relay node the S1-AP control signaling multiplexed by the multiplexing module.

By at least one of the above technical solutions, the present invention realizes that the relay radio access bearer service between the relay node and the serving gateway is carried by the relay radio access bearer, so that the relay node relays data between the UE and the S-GW, which meets requirements in the related art.

BRIEF DESCRIPTION OF THE DRAWINGS

Drawings are provided for the further understanding of the present invention and form a part of the specification, which are used to explain the present invention with embodiments of the present invention rather than limit the present invention, wherein.

DETAILED DESCRIPTION OF THE EMBODIMENTS

As stated above, after the Relay being introduced, there is still no technical solution for the Relay node to relay data between the UE and the S-GW in existing LTE system. For this reason, the present invention enables the Relay Node to relay data between the UE and the S-GW by modifying the bearer structure of the LTE system, i.e., bearing the relay radio access bearer service between the relay node and the serving gateway by the relay radio access bearer.

The present invention will be described below in detail with reference to drawings and in combination with embodiments. It should be noted that embodiments of the application and features thereof can be combined with each other.

There is provided a method for transmitting the relay data in accordance with the embodiment of the present invention, which is applied to a system including a relay. The method for transmitting the relay data includes: the relay radio access bearer service between the relay node and the serving gateway is carried by the relay radio access bearer. Embodiments of the present invention will be described below in detail.

Figure 9:
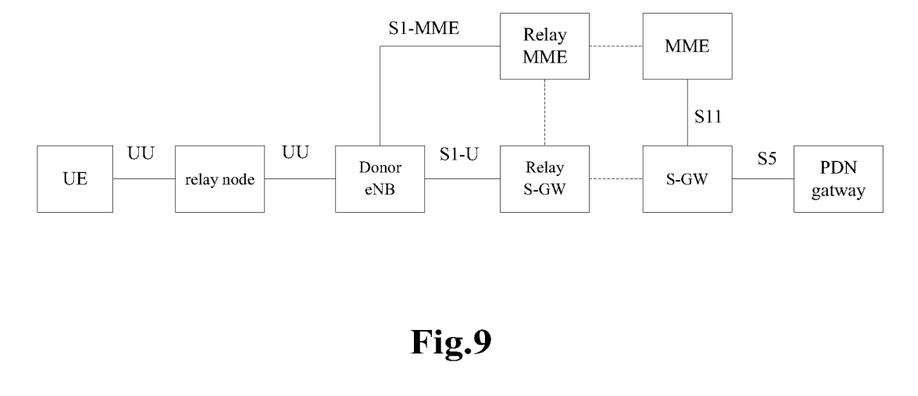
FIG. 9 is a network logical structure drawing of the LTE system into which the relay node is added.

FIG. 9 is a network logical structure drawing of the LTE system into which the relay node is added. As shown in FIG. 9, on the user plane, the relay S-GW (i.e., the relay serving gateway in the figure) interacts with the base station (i.e., the donor eNB shown in the figure), while on the control plane, the relay MME interacts with the base station via the S1-MME interface, wherein the relay G-SW can be a logical network element in terms of function, which can be realized on the S-GW, or can act as a separate network element between the eNB and the S-GW. The relay MME can be a logical network element in terms of function, which can be realized on the MME, or can act as a separate network element between the eNB and the MME.

Based on FIG. 9, embodiments of the present invention will be described below in detail in combination with the bearer structure of the LTE system shown in FIG. 10, into which the relay radio access bearer is added.

Figure 10:
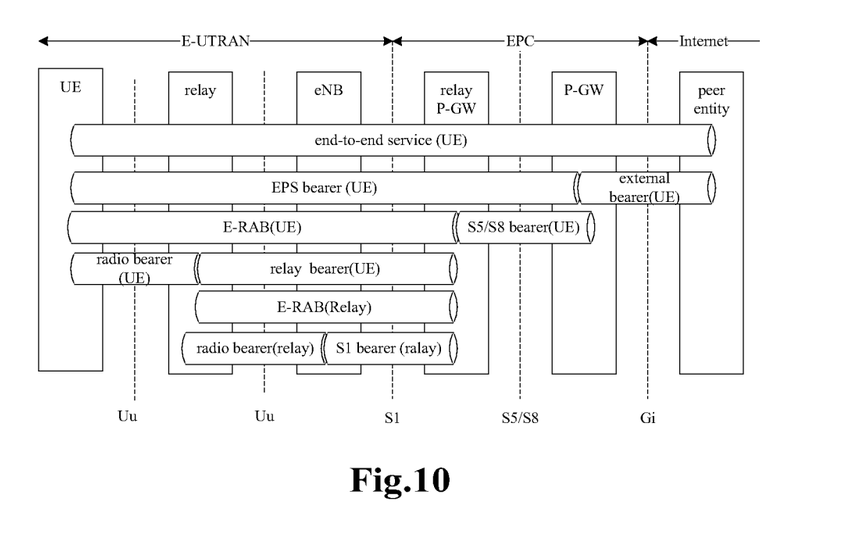
FIG. 10 is a structure drawing of the bearer of the LTE system into which the relay radio access bearer according to an embodiment of the present invention is added.

As shown in FIG. 10, the interface between the relay node (the Relay in the figure) and the donor eNB (i.e., the eNB in the figure) employs the existing air interface, i.e., the interface between the Macro UE and the donor eNB, so the Relay node can access to the donor-eNB as a common UE. E-RAB (Relay) (i.e., the above relay radio access bearer), which is the bearer connecting the Relay Node and the S-GW, is transmitted by the radio bearer (Relay) (abbreviated to RB) of the air interface between the Relay Node and the Donor eNB, and the S1 bearer (Relay) between the Donor eNB and the S-GW.

Each E-RAB of the UE, which is used to connect the UE and the core network, is transmitted by the Radio Bearer (UE) between the UE and the Relay Node, and the Relay Bearer (UE) between the Relay Node and the core network.

The Relay Bearers (UEs) of a plurality of UEs are transmitted by above E-RAB (Relay).

Before the relay radio access bearer service is bore, the relay node multiplexes the radio access bearer service from the plurality of terminals to obtain the relay radio access bearer service to be bore. Then, after the relay radio access bearer service is transmitted to the serving gateway, the serving gateway demultiplexes the received relay radio access bearer service. That is to say, the radio bearers (UEs) of the plurality of UEs can be bored by one E-RAB (Relay), moreover, one E-RAB (Relay) can bore S5/S8 bearers (UEs) corresponding to the plurality of radio bearers (UEs).

Figure 11:
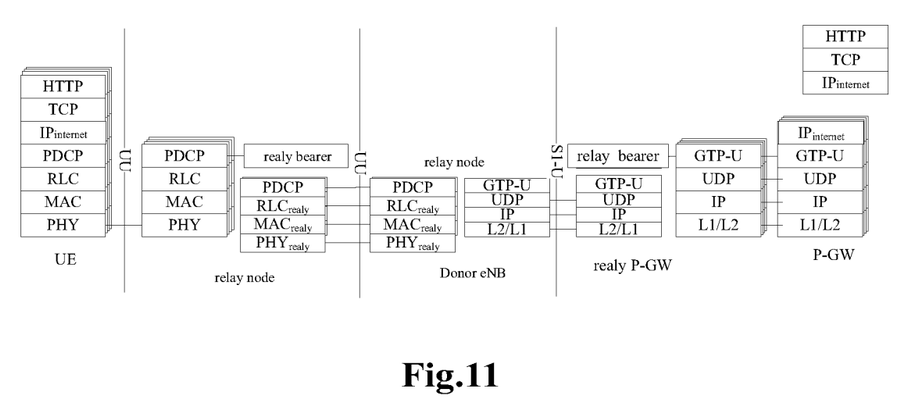
FIG. 11 is a schematic diagram of the user plane protocol stack after the relay bearer (UE) according to an embodiment of the present invention is added.

Corresponding to the bearer structure shown in FIG. 10, FIG. 11 shows a protocol stack of the user plane after the relay bearer (UE) being added. As shown in FIG. 11, the relay S-GW concept is incorporated into the protocol stack, and the relay S-GW can be a logical network element in terms of function, and can be realized on the S-GW or serve as a separate network element between the eNB and the S-GW. E-RAB (Relay) is used to bear the multiplexed service of the plurality of UEs subordinated to the Relay Node.

Figure 12:
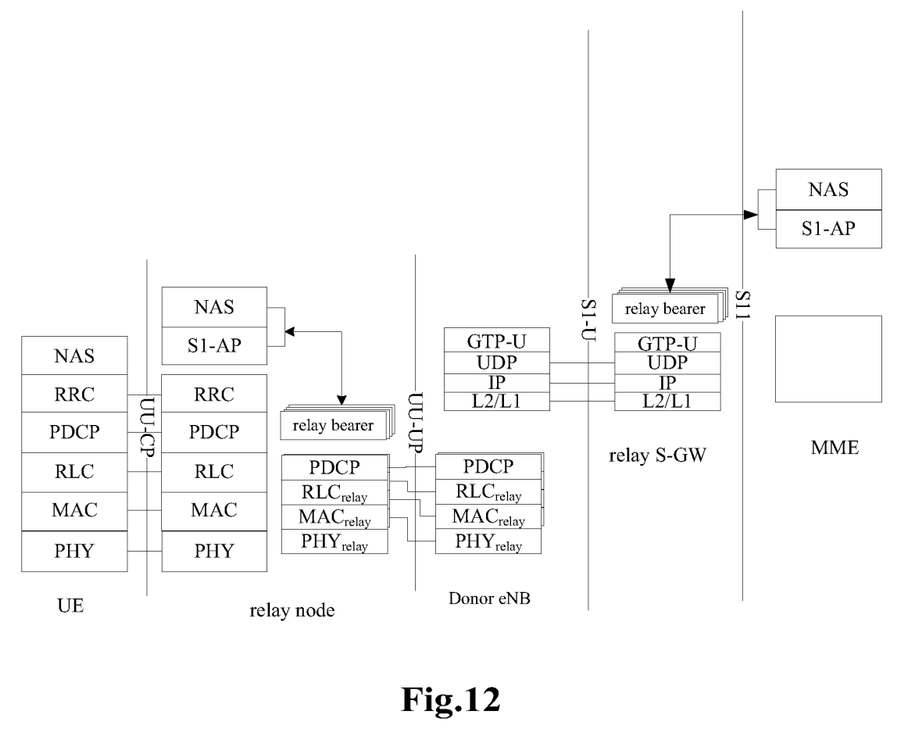
FIG. 12 is a schematic diagram of the control plane protocol stack after the relay bearer (UE) according to an embodiment of the present invention is added.
Figure 13:
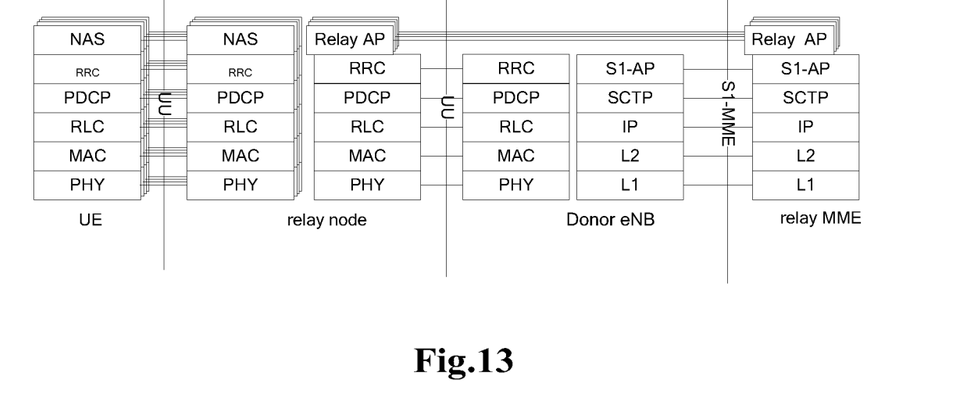
FIG. 13 is another schematic diagram of the control plane protocol stack after the relay bearer (UE) according to an embodiment of the present invention is added.

Corresponding to the bearer structure shown in FIG. 10, FIGS. 12 and 13 show two types of protocol stacks of the control plane after the relay bearers (UEs) being added, wherein:

As shown in FIG. 12, the S1-AP control signalings of the all UEs subordinated to the Relay Node interact between the Relay Node and the relay S-GW via one E-RAB (relay), that is, the S1-AP control signalings of the UEs are transmitted via the user plane bearer of the relay node;

As shown in FIG. 13, the S1-AP control signalings of the all UEs subordinated to the relay node interact between the relay node and the relay MME via the relay AP (Relay Application Protocol) layer, that is, the S1-AP control signaling of the UE is transmitted via the Relay AP PDU of the relay node, wherein, the relay AP layer of the relay node is mainly used to realize the function of multiplexing and demultiplexing the S1-AP control signaling of the UE; the relay AP layer of the relay MME is mainly used to realize multiplexing and demultiplexing the S1-AP control signaling of the UE, and forwarding the S1-AP control signaling according to the S1-AP control signaling identifier (i.e., S1-AP id). The relay AP PDU is regarded as the NAS (Non Access Stratum) PDU of the relay Node being transmitted between the relay node and the relay MME. The method can also be regarded as that the S1-AP control signaling of the UE is transmitted via the direct transfer message.

As seen from above description, in the case of not altering the donor eNB, the relay radio access bearer service between the relay node and the serving gateway is bore by the relay radio access bearer, which realizes the process of relaying data between the UE and the S-GW via the Relay, the function of relay in the air, enhancement in network coverage and increase in network throughput.

In order to further understand embodiments of the present invention, based on the bearer structure shown in FIG. 10, the processes of relaying data on the user plane and the control plane will be described below respectively.

(1) User Plane

The E-RABs of the plurality of UEs subordinated to the relay node are transmitted between the relay node and the S-GW via the E-RAB (Relay).

In the above, the radio bearer (UE) of one UE subordinated to the relay node corresponds to one relay bearer (UE), and corresponds to one S5/S8 bearer (UE) on the relay S-GW. The radio bearers (UEs) of a plurality of UEs may be bored by one E-RAB (relay), and one E-RAB (relay) may bore S5/S8 bearers (UEs) corresponding to the plurality of radio bearers (UEs).

Before the E-RAB is transmitted by the relay node, the following three multiplex identifiers can be selected to perform multiplex operation on the E-RABs of the plurality of terminals: (1) the GTP-U address allocated to the radio bearer of the E-RAB for being used as the multiplex identifier; (2) the identifier allocated to each radio access bearer for being used as the demultiplex identifier; (3) the TEID for being used as the multiplex identifier. Accordingly, the demultiplex operation is performed in the relay S-GW with the same multiplex identifier.

The process of relaying data on the user plane will be described below in detail by taking the above three ways as examples respectively.

Example 1

The Virtual GTP-U Address being Used as the Multiplex Identifier

Figure 14:
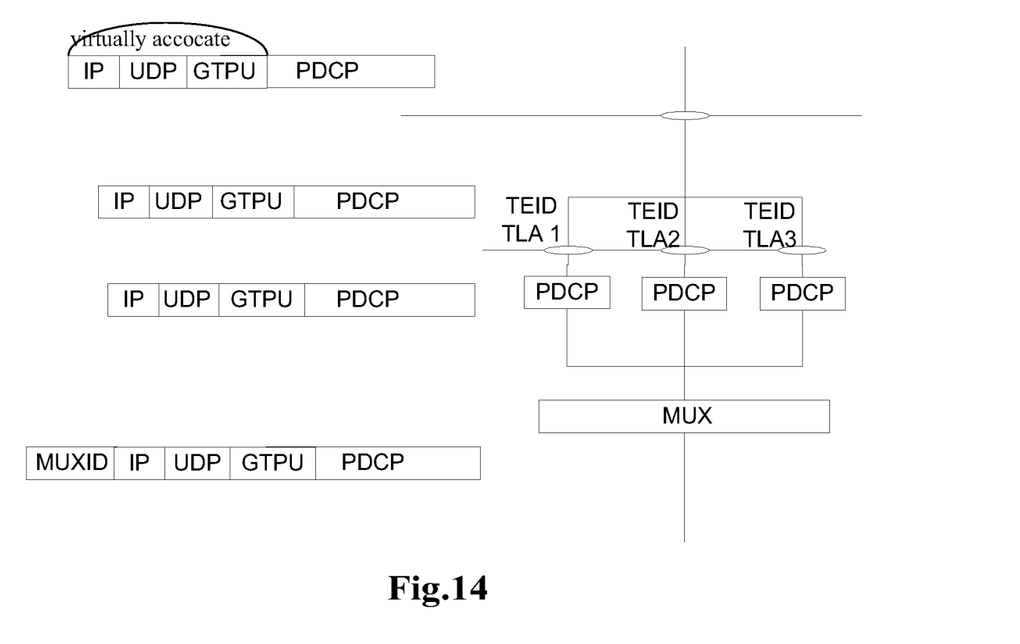
FIG. 14 is a schematic diagram for multiplexing virtual GTP-U address in the method for transmitting the relay data according to an embodiment of the present invention.

FIG. 14 is a schematic diagram for multiplexing virtual GTP-U address in the method for transmitting the relay data according to embodiments of the present invention. As shown in FIG. 14, the process of establishing the user plane service of each UE in the relay node is the same as the process of the macro UE, in which the virtual GTP-U tunnel address allocated to each service RB of each UE in the relay node corresponds to the GTP-U tunnel address allocated by the MME. Thus, the existing S1 process can be retained without changes. The user plane PDU of each service of different UEs is identified by the TEID and the transport layer address in the E-RAB (relay), and the multiplex and demultiplex function are accomplished by the relay bearer layers of the relay node and the relay S-GW.

For uplink data processing, based on the fact that the GTP-U address allocated by the MME to each service RB as the multiplex identifier, the user plane PDU of the E-RAB (Relay) is generated by the relay node, and transmitted to the Donor-eNB via the air interface. The transmission in S1 employs the GTP-U address of the E-RAB (Relay), that is, the GTP-U tunnel is employed for the transmission from the donor node to the relay S-GW. After the relay S-GW receives the user plane PDU of the E-RAB (Relay), demultiplex is performed via the head identifier (i.e., GTP-U address) to obtain the user plane PDU of each service, then the user plane PDUs of these services are sent to the opposite end of corresponding GTP-U tunnel. Thus, the transmission process that the UE data of the relay node is transmitted from the relay node to the S-GW is completed, in which the relay node serves as a airborne relay.

For the downlink data processing, it is similar to the uplink data processing, wherein the multiplex and demultiplex functions are implemented by the relay S-GW and the relay node respectively.

As stated above, because the virtual GTP-U address is used as the multiplex identifier, so the head overhead is increased by (20+4) bytes, wherein, the transport layer address accounts for 20 bytes, while the TEID accounts for 4 bytes.

Based on the QoS guarantee of the air interface, similar services required by QoS can be multiplexed into the same E-RAB (Relay). The relay node can establish 256 E-RABs (Relay) at most. The mapping relationship from the relay bearer (UE) of such a UE to the E-RAB (Relay) can be generated by the Relay node or the Relay S-GW according to a certain regulation based on the QoS requirement of each service, and the opposite end is informed with the mapping relationship.

Example 2

The Identifier of Each RAB of the UE being Used as the Multiplex Identifier

In embodiment 1, because multiplex is performed with the virtual GTP-U address, so the head overhead is considerably big, and in the present embodiment, multiplex is performed with the method of employing one identifier for each RAB of the UE, because the UE number of the relay node will not be big, thus the head overhead is not more than 3 bytes.

Figure 15:
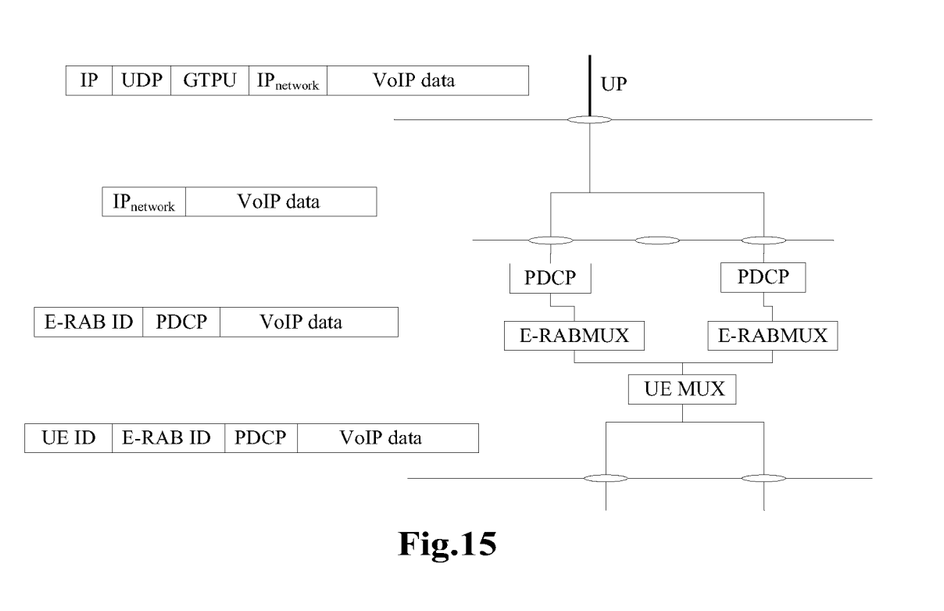
FIG. 15 is a schematic diagram for multiplexing each RAB identifier in the method for transmitting the relay data according to an embodiment of the present invention.

FIG. 15 is a schematic diagram for multiplexing each RAB identifier in the method for transmitting the relay data according to an embodiment of the present invention. As shown in FIG. 15, the multiplexed head identifier is allocated by the relay node or the relay G-SW, the process of establishing the user plane service of each UE in the relay node is the same as the process of the Macro UE, but the GTP-U tunnel address is no longer allocated to each service RB of each UE, and only one E-RAB identifier is required.

The mapping relationship from the E-RAB of the UE to the E-RAB (relay) id is generated by the Relay node or the Relay S-GW according to a certain regulation based on the QoS requirement of each service, and the opposite end is informed with the mapping relationship.

For the process of the uplink data and the downlink data, reference can be made to related description in example 1, which will not be described herein for simplicity.

Example 3

The TEID being Used as the Multiplex Identifier

The method for multiplexing the TEID is used so as to not alter existing service process and save head overhead, and the multiplexed head overhead is 4 bytes.

Figure 16:
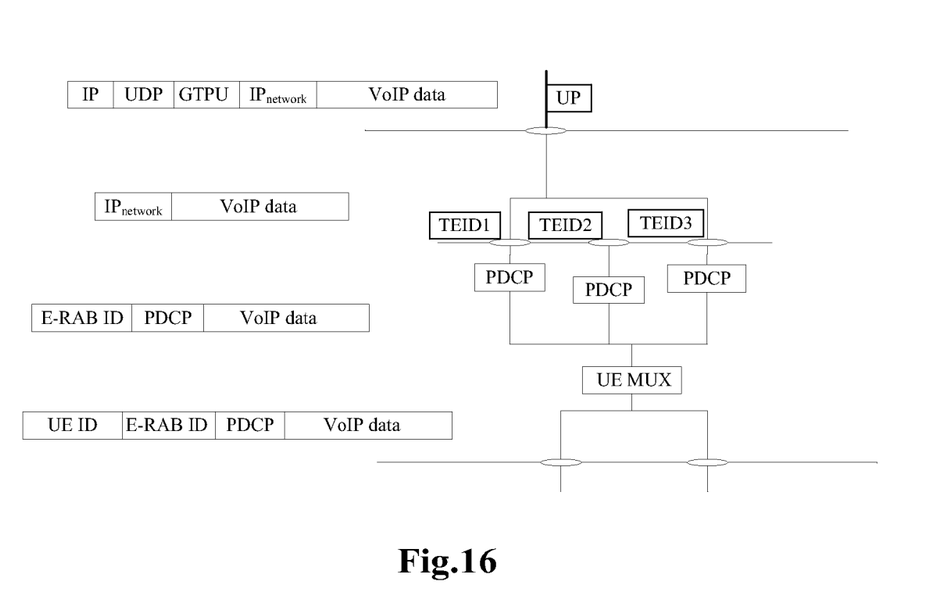
FIG. 16 is a schematic diagram for multiplexing TEID in the method for transmitting the relay data according to an embodiment of the present invention.

FIG. 16 is a schematic diagram for multiplexing the TEID in the method for transmitting the relay data according to an embodiment of the present invention. As shown in FIG. 16, the S-GW can forward data based on the TEID. For the processing of the uplink data and the downlink data, reference can be made to related description in the example 1, which will not be described herein for simplicity.

(2) Control Plane

By taking that the S1-AP control signaling of the control plane of the UE subordinated to the Relay Node is carried respectively on the user plane or the control plane of the Relay Node as an example, the transmission process of the relay data on the control plane will be described in detail.

Example 4

The S1-AP Control Signaling of the Control Plane of the UE is Transmitted on the Control Plane of the Relay Node Based on the protocol stack of the control plane shown in FIG. 12, the S1-AP control signalings of all UEs subordinated to the Relay Node interact between the Relay Node and the Relay S-GW via the E-RAB (Relay), i.e., the S1-AP control signalings of the UEs are transmitted via the bearer of the user plane of the Relay Node.

For the processing of the uplink S1-AP control signaling: the Relay Node generates the S1-AP control signaling of the UE subordinated to which, and the S1-AP control signaling is multiplexed into the user plane PDU of the E-RAB (Relay) via the S1-AP control signaling identifier (i.e., S1-AP id), and transmitted to the Donor-eNB via the air interface. The transmission at S1 also needs the GTP-U address of the E-RAB (Relay), i.e., through GTP-U tunnel manner from the Donor-eNB to the Relay S-GW. After the Relay S-GW receives the user plane PDU of the E-RAB (Relay), the demultiplex operation is performed via the S1-AP id to obtain the S1-AP control signaling of each UE, which is then sent to a corresponding MME.

For the initial direct transfer message, since the S1-AP id has not been allocated yet, it is required for the Relay S-GW to unpack the direct transfer message, which is sent to the corresponding MME according to the MMEC (MME code) therein.

For the processing of the downlink S1-AP control signaling, it is similar to the processing of the uplink S1-AP control signaling, wherein the multiplex and demultiplex functions are implemented by the relay S-GW and the relay node respectively. The Relay Node or the Relay S-GW generates the mapping relationship between the S1-AP id of the UE and the E-RAB (Relay) id, and informs the opposite end. Considering the QoS, the S1-AP control signalings of all UEs can be mapped into the same E-RAB (Relay).

Example 5

The S1-AP Control Signaling of the Control Plane of the UE being Transmitted on the Control Plane of the Relay Node Based on the protocol stack of the control plane shown in FIG. 13, the S1-AP control signalings of all UEs subordinated to the Relay Node interact between the Relay Node and the Relay MME via the control plane (Relay AP), i.e., the S1-AP control signaling of the UE is transmitted by the Relay AP of the Relay Node. The Relay MME can be a logical network element in terms of function, which can be realized on a MME, or act as a separate network element between the eNB and the MME.

For the processing of the uplink S1-AP control signaling: the S1-AP control signalings of all UEs subordinated to the Relay AP of the Relay Node is multiplexed into the Relay AP PDU via the UE S1-AP id, and transmitted to the Donor-eNB via the air interface, then the Relay AP PDU is sent to the Relay MME by the Donor-eNB via the S1-AP. After the Relay MME receives the Relay AP PDU of the Relay Node, the demultiplex operation is performed via the S1-AP id to obtain the S1-AP control signaling of each UE, which is then sent to the corresponding MME.

For the initial direct transfer message, since the S1-AP id has not been allocated yet, it is required for the Relay MME to unpack the direct transfer message, which is sent to the corresponding MME according to the MMEC (MME code) therein.

For the processing of the downlink S1-AP control signaling, it is similar to that of the uplink S1-AP in the present example, and the multiplex and demultiplex functions are implemented respectively by the Relay MME and the Relay AP of the Relay Node.

Device Embodiment 1

Figure 17:
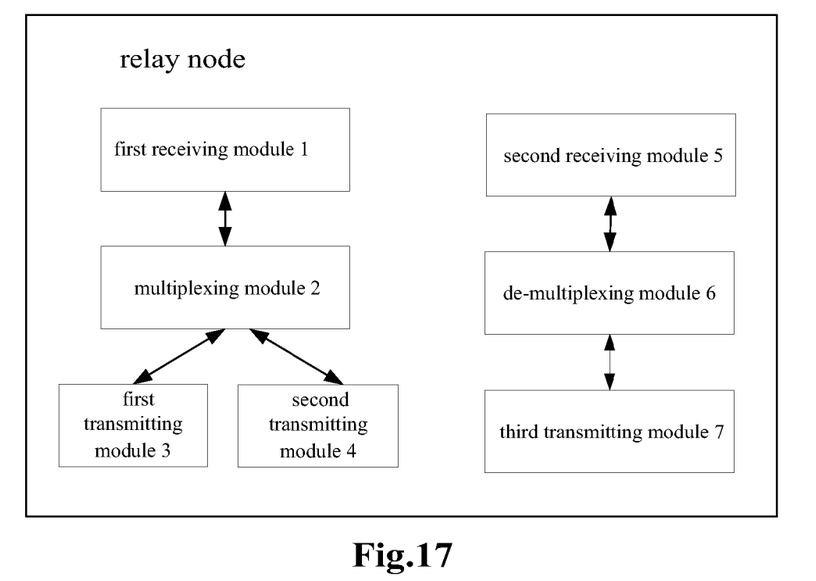
FIG. 17 is a block diagram of the relay node according to an embodiment of the present invention.

There is provided a relay node according to an embodiment of the present invention. Preferably, the relay node is used to implement the function of the Relay Node in the method embodiment. FIG. 17 is a block diagram of the relay node. As shown in FIG. 17, the relay node comprises: a first reception module 1, a multiplexing module 2, a first transmitting module 3 and a second transmitting module 4, a second receiving module 5, a de-multiplexing module 6 and a third transmitting module 7, wherein the first receiving module 1 is configured to receive the radio access bearer service of the terminal and the S1-AP control signaling;

the multiplexing module 2, which is connected to the receiving module 1, is configured to multiplex the radio access bearer service and/or the S1-AP control signalings of a plurality of terminals received by the receiving module 1; and preferably, the multiplexing module is configured to perform the three multiplex operations in the method embodiment;

the first transmitting module 3, which is connected to the multiplexing module 2, is configured to transmit the radio access bearer service and/or the S1-AP control signaling multiplexed by the multiplexing module 2 to the S-GW via the relay radio access bearer;

the second transmitting module 4, which is connected to the multiplexing module 2, is configured to transmit the S1-AP control signaling multiplexed by the multiplexing module via the control plane;

the second receiving module 5 is configured to receive the relay radio access bearer service from the CN;

the demultiplexing module 6, which is connected to the second receiving module 5, is configured to de-multiplexing the relay radio access bearer service received by the second receiving module 5 to obtain the radio access service data flow of each UE;

the third transmitting module 7, which is connected to the de-multiplexing module 6, is configured to send the demultiplexed radio access bearer service of the UE to the UE via an air interface, so as to implement the relay by the air interface.

Reference can be made to the related description of the method embodiments for particular implementation processes of the modules, which will not be described herein for simplicity.

As can be seen from the above description, after the received data is multiplexed by the multiplexing module, the multiplexed data is transmitted to the S-GW via the relay radio access bearer by the first transmission module and the second transmission module respectively, so as to realize the function of relay in the air.

Device Embodiment 2

Figure 18:
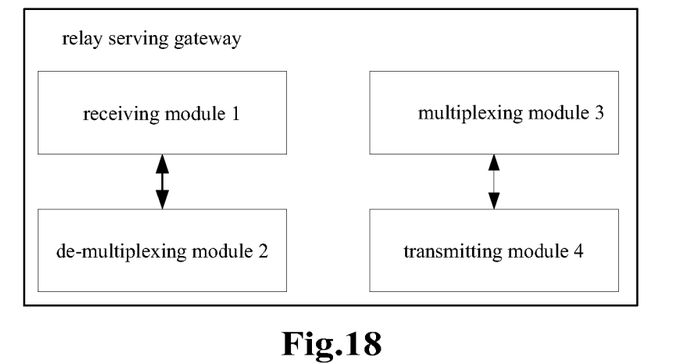
FIG. 18 is a block diagram of the serving gateway according to an embodiment of the present invention.

There is provided a relay S-GW according to an embodiment of the present invention, preferably, the relay S-GW is used to implement the function of the Relay S-GW in the method embodiment. FIG. 18 is a block diagram of the S-GW. As shown in FIG. 18, the S-GW comprises: a receiving module 1, a de-multiplexing module 2, a multiplexing module 3 and a transmitting module 4, wherein, the receiving module 1 is configured to receive the multiplexed S1-AP control signaling and the radio access bearer service from the relay node;

the de-multiplexing module 2, which is connected to the reception module 1, is configured to demultiplex the multiplexed S1-AP control signaling and the radio access bearer service received by the receiving module;

the multiplexing module 3 is configured to multiplex the S1-AP control signaling and the radio access bearer service needed to be sent to the relay node from the CN, and to generate the relay radio access bearer service;

the transmitting module 4, which is connected to the multiplexing module 3, which is configured to transmit the radio access bearer service and/or the S1-AP control signaling multiplexed by the multiplexing module via the relay radio access bearer to the relay node.

Device Embodiment 3

Figure 19:
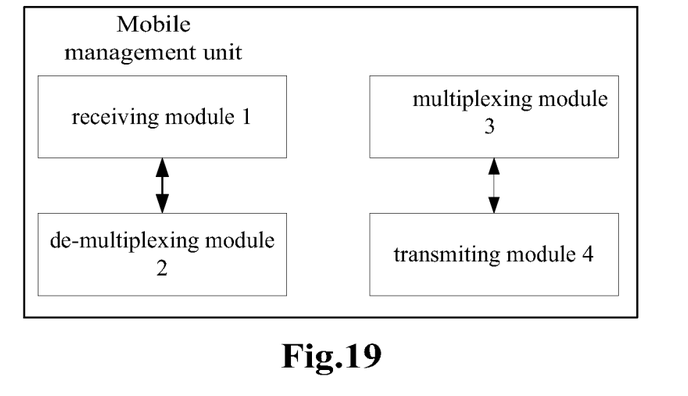
FIG. 19 is a block diagram of the mobility management network element according to an embodiment of the present invention.

There is provided a mobility management network element according to embodiments of the present invention, preferably, the mobility management network element is used to implement the function of the Relay MME in the method embodiment. FIG. 19 is a block diagram of the mobility management network element, as shown in FIG. 19, the mobility management network element includes: a receiving module 1, a de-multiplexing module 2, multiplexing module 3, and a transmitting module 4, wherein, the receiving module 1 is configured to receive the multiplexed S1-AP control signaling from the relay node;

the demultiplexing module 2, which is connected to the receiving module 1, which is configured to demultiplex the multiplexed S1-AP control signaling received by the receiving module 1 to obtain the S1-AP control signaling of each UE;

the multiplexing module 3 is configured to perform a multiplex operation on the S1-AP control signalings of a plurality of UEs;

the transmitting module 4, which is connected to the multiplexing module 3, is configured to transmit, via a control plane direct transfer message, to the relay node the S1-AP control signaling multiplexed by the multiplexing module.

Reference can be made to the related description of the method embodiments for particular implementation processes of the modules, which will not be described herein for simplicity.

System Embodiment

There is provided a system for transmitting relay data according to an embodiment of the present invention, which comprises the relay node in the device embodiment 1 and the relay S-GW in the device embodiment 2, and/or the mobility management network element in device embodiment 3.

In summary, by means of embodiments of the present invention, the function of relay in the air is realized, which is backwards compatible with R8 eNB, thus eNBs of whole networks can support a Relay Node, and support a mobile Relay Node or a nomad Relay Node completely, so as to achieve the function of relay in the air, and enhance network coverage and increase network throughput.

Obviously, those skilled in the art shall understand that respective modules and steps of the present invention can be implemented with general computation devices integrated together or allocated in the network formed by a plurality of computation devices, alternatively implemented with program codes executable by computation devices, which can be stored in memory devices for execution by the computation devices, or implemented with ICs, or several modules or steps can be implemented with a single IC. Thus, the present invention is not limited to any particular hardware and software combination.

Above description is to illustrate the preferred embodiments not limit the present invention. Various alterations and changes to the present invention are apparent to those skilled in the art. The scope defined in claims shall comprise any modification, equivalent substitution and improvement in the spirit and principle of the present invention.

What is claimed is:

1. A method for transmitting relay data, which is applied in a Long Term Evolution (LTE) system comprising a relay node accessing the LTE system in a role of a User Equipment (UE), the method comprising:
    the relay node or a relay Serving Gateway (S-GW) multiplexing a radio access bearer service of a plurality of terminals to obtain the relay radio access bearer service to be bore; and
    wherein the relay radio access bearer service between the relay node and the relay S-GW is bore by a relay radio access bearer,
    the relay node or the relay S-GW receiving and demultiplexing the received relay radio access bearer service;
    wherein the relay radio access bearer is a bearer connecting the Relay Node and the S-GW, and comprises a radio bearer between the Relay Node and an eNB and an S1 bearer between the eNB and the S-GW;
    wherein the relay node or the relay S-GW makes the user plane protocol address of tunneling protocol allocated to the radio bearer of the radio access bearer service, to be used as the identifier for multiplexing and/or demultiplexing; or, the relay node or the relay S-GW makes the identifier allocated to each radio access bearer to be used as the identifier for multiplexing and/or demultiplexing; or, the relay node or the relay S-GW makes the tunnel endpoint identifier allocated to the radio bearer of the radio access bearer service to be used as the identifier for multiplexing and/or demultiplexing.

2. The method according to claim 1, wherein after the relay node multiplexes the radio access bearer service of a plurality of terminals and the relay radio access bearer bears the relay radio access bearer service, the method further comprises:
    the relay S-GW receiving the bore relay radio access bearer service, and demultiplexes the received relay radio access bearer service, to obtain the radio access bearer services of the multiple terminals.

3. The method according to claim 2, further comprising one of the following:
    the relay node or the relay S-GW making the user plane protocol address of tunneling protocol allocated to the radio bearer of the radio access bearer service, to be used as the identifier for multiplexing and/or demultiplexing;
    the relay node or the relay S-GW making the identifier allocated to each radio access bearer to be used as the identifier for multiplexing and/or demultiplexing; and
    the relay node or the relay S-GW making the tunnel endpoint identifier allocated to the radio bearer of the radio access bearer service to be used as the identifier for multiplexing and/or demultiplexing.

4. The method according to claim 1, wherein after the relay S-GW multiplexes the radio access bearer service needed to be sent to the multiple terminals and the relay radio access bearer carries the relay radio access bearer service, the method further comprises:
    the relay node receiving the bore relay radio access bearer service, and demultiplexes the received relay radio access bearer service, to obtain the radio access bearer service needed to be sent to the multiple terminals.

5. The method according to claim 4, further comprising one of the following:
    the relay node or the relay S-GW making the user plane protocol address of tunneling protocol allocated to the radio bearer of the radio access bearer service, to be used as the identifier for multiplexing and/or demultiplexing;
    the relay node or the relay S-GW making the identifier allocated to each radio access bearer to be used as the identifier for multiplexing and/or demultiplexing; and
    the relay node or the relay S-GW making the tunnel endpoint identifier allocated to the radio bearer of the radio access bearer service to be used as the identifier for multiplexing and/or demultiplexing.

6. The method according to claim 1, wherein the relay radio access bearer is further configured to transmit the S1-AP control signaling of the terminal on the user plane or the control plane.

7. The method according to claim 6, wherein the step of the relay radio access bearer transmitting the S1-AP control signaling of the terminal on the user plane comprises:
    the relay node or the relay S-GW multiplexing the S1-AP control signaling of the multiple terminals according to respective S1-AP identifier, to obtain the relay radio access bearer service to be bore.

8. The method according to claim 6, wherein the step of the relay radio access bearer transmitting the S1-AP control signaling of the terminal on the control plane comprises:
    the S1-AP control signaling of the terminals is transmitted via a control plane direct transfer message of the relay radio access bearer, wherein the S1-AP control signaling of the multiple terminals according to a S1-AP identifier multiplexed as a part of the control plane direct transfer message of the relay radio access bearer, so as to be transmitted; and
    in the case that the relay node performs the multiplex operation, a core network mobility management entity performs a demultiplex operation; or in the case that the core network mobility management entity performs the multiplex operation, the relay node performs a demultiplex operation.

9. A relay node accessing a Long Term Evolution (LTE) system in a role of a User Equipment (UE), comprising:

a first receiving module, configured to receive radio access bearer service from a terminal;
a second receiving module, configured to receive relay radio access bearer service from the core network;
a multiplexing module, configured to multiplex the S1-AP control signaling and/or the radio access bearer service of the multiple terminals received by the first receiving module;
a de-multiplexing module, configured to demultiplex the multiplexed S1-AP control signaling and/or the radio access bearer service received by the second receiving module;
a first transmitting module, configured to transmit, via a relay radio access bearer, to the S-GW the radio access bearer service and/or the S1-AP control signaling multiplexed by the multiplexing module;
a second transmitting module, configured to transmit via a control plane the S1-AP control signaling multiplexed by the multiplexing module; and
a third transmitting module, configured to send, via an air interface, to the terminal the demultiplexed radio access bearer service of the terminal,
wherein the relay radio access bearer is a bearer connecting the Relay Node and the S-GW, and comprises a radio bearer between the Relay Node and an eNB and an S1 bearer between the eNB and the S-GW;
wherein the relay node makes the user plane protocol address of tunneling protocol allocated to the radio bearer of the radio access bearer service, to be used as the identifier for multiplexing and/or demultiplexing; or, the relay node makes the identifier allocated to each radio access bearer to be used as the identifier for multiplexing and/or demultiplexing; or, the relay node makes the tunnel endpoint identifier allocated to the radio bearer of the radio access bearer service to be used as the identifier for multiplexing and/or demultiplexing.

10. A relay Serving Gateway (S-GW) comprising:
a receiving module, configured to receive the multiplexed S1-AP control signaling and/or the radio access bearer service from a relay node accessing a Long Term Evolution (LTE) system in a role of a User Equipment (UE);
a de-multiplexing module, configured to demultiplex the S1-AP control signaling and/or the radio access bearer service which are multiplexed and received by the receiving module;
a multiplexing module, configured to multiplex the S1-AP control signaling and/or the radio access bearer service from the core network; and
a transmitting module, configured to transmit, via a relay radio access bearer, to the relay node the radio access bearer service and/or the S1-AP control signaling multiplexed by the multiplexing module,
wherein the relay radio access bearer is a bearer connecting the Relay Node and the S-GW, and comprises a radio bearer between the Relay Node and an eNB and an S1 bearer between the eNB and the S-GW;
wherein the relay S-GW makes the user plane protocol address of tunneling protocol allocated to the radio bearer of the radio access bearer service, to be used as the identifier for multiplexing and/or demultiplexing; or, the relay S-GW makes the identifier allocated to each radio access bearer to be used as the identifier for multiplexing and/or demultiplexing; or, the relay S-GW makes the tunnel endpoint identifier allocated to the radio bearer of the radio access bearer service to be used as the identifier for multiplexing and/or demultiplexing.

11. A system for transmitting the relay data, comprising: a relay node accessing a Long Term Evolution (LTE) system in a role of a User Equipment (UE) and a Serving Gateway (S-GW), and/or a mobility management network element,
wherein the relay node comprises:
a first receiving module, configured to receive a S1-AP control signaling and a radio access bearer service from a terminal;
a second receiving module, configured to receive relay radio access bearer service from the core network;
a multiplexing module, configured to multiplex the S1-AP control signaling and/or the radio access bearer service of the multiple terminals received by the first receiving module;
a de-multiplexing module, configured to demultiplex the multiplexed S1-AP control signaling and/or the radio access bearer service received by the second receiving module;
a first transmitting module, configured to transmit, via a relay radio access bearer, to the S-GW the radio access bearer service and/or the S1-AP control signaling multiplexed by the multiplexing module;
a second transmitting module, configured to transmit via a control plane the S1-AP control signaling multiplexed by the multiplexing module; and
a third transmitting module, configured to send, via an air interface, to the terminal the demultiplexed radio access bearer service of the terminal,
the relay S-GW comprises:
a receiving module, configured to receive the multiplexed S1-AP control signaling and/or the radio access bearer service from the relay node;
a de-multiplexing module, configured to demultiplex the S1-AP control signaling and/or the radio access bearer service which are multiplexed and received by the receiving module;
a multiplexing module, configured to multiplex the S1-AP control signaling and/or the radio access bearer service from the core network; and
a transmitting module, configured to transmit, via the relay radio access bearer, to the relay node the radio access bearer service and/or the S1-AP control signaling multiplexed by the multiplexing module,
the mobility management network element comprises:
a receiving module, configured to receive the multiplexed S1-AP control signaling from the relay node;
a de-multiplexing module, configured to demultiplex the multiplexed S1-AP control signaling received by the receiving module;
a multiplexing module, configured to multiplex a plurality of S1-AP control signalings; and
a transmitting module, configured to transmit, via a control plane direct transfer message, to the relay node the S1-AP control signaling multiplexed by the multiplexing module,
wherein the relay radio access bearer is a bearer connecting the Relay Node and the S-GW, and comprises a radio bearer between the Relay Node and an eNB and an S1 bearer between the eNB and the S-GW;
wherein the relay node or the relay S-GW makes the user plane protocol address of tunneling protocol allocated to the radio bearer of the radio access bearer service, to be used as the identifier for multiplexing and/or demultiplexing; or, the relay node or the relay S-GW makes the identifier allocated to each radio access bearer to be used as the identifier for multiplexing and/or demultiplexing; or, the relay node or the relay S-GW makes the tunnel endpoint identifier allocated to the radio bearer of the radio access bearer service to be used as the identifier for multiplexing and/or demultiplexing.

* * * * *